J. P. GARDNER.
NUT LOCK.
APPLICATION FILED APR. 12, 1917.

1,236,077.

Patented Aug. 7, 1917.

Witnesses

Inventor
J. P. Gardner
By
Attorneys

UNITED STATES PATENT OFFICE.

JOHN P. GARDNER, OF SAN FRANCISCO, CALIFORNIA.

NUT-LOCK.

1,236,077. Specification of Letters Patent. Patented Aug. 7, 1917.

Application filed April 12, 1917. Serial No. 161,617.

*To all whom it may concern:*

Be it known that I, JOHN P. GARDNER, a citizen of the United States, residing at 574 3rd St., San Francisco, in the county of San Francisco, State of California, have invented a new and useful Nut-Lock; and I do hereby declare the following to be a full, clear, and exact description of the invention, such as will enable others skilled in the art to which it appertains to make and use the same.

The invention relates to nut-locks and is designed for the particular purpose for securely locking nuts on their bolts, when the bolts are in close proximity to each other, as found in rail joints and the like.

A further object is to provide, in such a device, means for affixing it to the nuts and bolts after they have been tightened.

A still further object is to provide a nut lock to be connected between two bolts, the device having means for engaging the threads of the bolt and for covering the nut in such a manner that the movement thereof is precluded.

A still further object is to provide, in such a device means to permit it to maintain its locking function upon the nuts irrespective of the expansion or contraction of the part between which the device is connected.

Other objects will appear from the detailed description which follows.

Should the drawings and specification vary to the extent of having the one set forth some structure that is not defined by the other, the right to such structure is claimed as though it had been fully treated by both.

The invention has particular utility as a lock for the nuts of railway splices and is illustrated as such. It may, however, be used with equal advantages elsewhere, when the nuts or bolts situated near each other are to be locked against turning. The right is claimed to vary the particular form of the invention shown in the drawings to any extent compatible with the spirit of the appended claims.

The same numerals of reference designate the same parts in all the several figures of the drawings, wherein.

Figure 1:
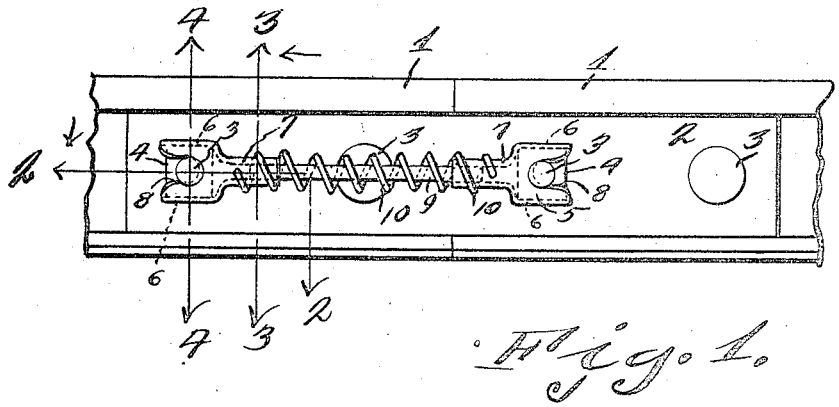
Figure 1 is a side elevation, showing the improved nut lock applied to a rail joint.
Figure 2:
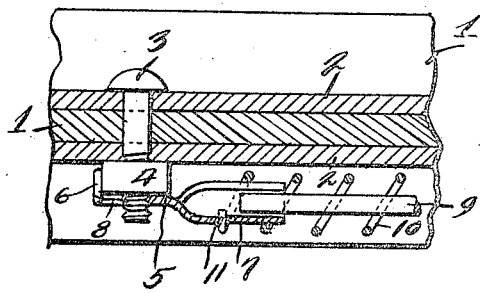
Fig. 2 is a section on the line 2—2 of Fig. 1.
Figure 3:
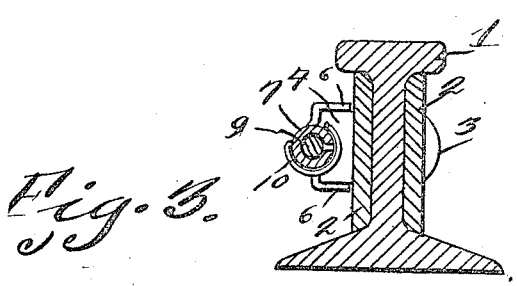
Fig. 3 is a section on the line 3—3 of Fig. 1.
Figure 4:
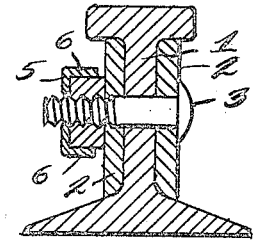
Fig. 4 is a section on the line 4—4 of Fig. 1.

In the drawings, 1 represents the conventional rail section, 2 the fish plates, 3 the bolts and 4 the nuts, all of these parts being assembled in the usual well known manner.

The nut lock is designed to be attached to the nuts of any two bolts on the same side of the fish plate, as shown in Fig. 1. The attachment for each nut comprises the plate 5 having the flanges 6 turned in opposite sides and having the tubular extensions 7 formed integral therewith. A central U-shaped slot 8 is provided in the plate 5 and opens on that edge remote from the extension 7, the edges of the slot being beveled to a sharp edge, so that this edge may engage the threads of the bolt 3.

Each locking device comprises a pair of the plates 5 with the tubular extensions 7 and these are united by a rod 9 and a spiral spring 10 in surrounding relation to the rod and to the extensions 7. The spring 10 has turned ends 11 which penetrate holes formed in the extensions 7 and thereby secure the two plates 5 together, as the rod 9 is designed to permit the plates 5 and tubular extensions 7 to be moved with respect to it.

The operation of the device is apparent from a consideration of the drawings.

When the nuts 4 have been tightened, the device is applied by compressing the spring 10 sufficiently to permit the plates 5 to be set down upon them, whereupon the spring is relieved of compression when the beveled edges of the slots 8 engage in the threads of the bolts 3. Either nut 4 is then prevented from turning by the flanges 6 without turning the plate 5 and these plates are prevented from turning by the rod 9 connected between them. It will be seen that the plates 5 are kept in engagement with the nuts 4, because of the sharp edges of the slots 8 engaging the threads of the bolts 3. It will be seen further that the pressure of the spring 10 will always operate to keep the slots 8 in engagement with the bolt threads irrespective of whether the rails 1 expand or contract.

What is claimed is:

1. In a nut-lock for rail joints and the like comprising a pair of plates, each having flanges to engage the sides of a nut and having a central slot opening at one edge, the slot having a beveled edge adapted to engage the threads of a bolt, a rod member engaging both plates and securing each against turning movement in respect to the other, and means connecting the plates whereby their slots may be kept in engagement with the bolts irrespective of the expansion or contraction of the rails.

2. In a nut-lock for rail joints and the like comprising a pair of plates, each having flanges to engage the sides of a nut, an integral tubular extension and a central slot opening at one edge, the slot having a beveled edge adapted to engage the threads of a bolt, a rod member engaging the tubular extensions of both plates and securing the plates against turning movement with respect to each other, the rod being movable longitudinally in the tubular extension, and a spiral spring in surrounding relation to the rod member and to the tubular extension and connected to the tubular extension to attach the plates together, whereby the slots in the plates may be kept in engagement with the bolts irrespective of the expansion or contraction of the rails.

In testimony whereof I have signed my name to this specification in the presence of two subscribing witnesses.

JOHN P. GARDNER.

Witnesses:
 JOHN R. YOUNG,
 J. H. KLOUSE.